United States Patent
Caiozza

Patent Number: 6,004,459
Date of Patent: *Dec. 21, 1999

[54] METAL PARTICLE REMOVAL AND RETENTION APPARATUS

[76] Inventor: Joseph Caiozza, 321 W. Market St., Long Beach, N.Y. 11561

[*] Notice: This patent is subject to a terminal disclaimer.

[21] Appl. No.: 08/929,336

[22] Filed: Sep. 13, 1997

[51] Int. Cl.$^6$ ................................................ B01D 35/06
[52] U.S. Cl. .................... 210/222; 210/223; 210/249; 210/444; 184/6.25
[58] Field of Search .................... 210/222, 223, 210/695, 232, 440, 444, 450, 238, DIG. 117, 249, 282; 184/6.25

[56] References Cited

U.S. PATENT DOCUMENTS

| | | | |
|---|---|---|---|
| 5,114,572 | 5/1992 | Hunter et al. | 210/444 |
| 5,510,024 | 4/1996 | Caaiozza | 210/223 |
| 5,714,063 | 2/1998 | Brunsting | 210/222 |
| 5,879,549 | 3/1999 | Caiozza | 210/223 |

Primary Examiner—David A. Reifsnyder

[57] ABSTRACT

A metal particle removal and retention apparatus includes a canister-retention bracket, a liquid inlet channel connected to the canister-retention bracket, a liquid outlet channel connected to the canister-retention bracket, and a canister assembly connected to the canister-retention bracket. The canister assembly is in communication with the liquid inlet channel and the liquid outlet channel. A magnet attachment assembly attached to the canister assembly. The canister assembly includes a canister housing which includes an exterior magnet-attachment-reception portion which receives the magnet attachment assembly. The canister assembly includes an interior particle-reception pan attached to an interior pan-reception portion of the canister housing. The interior pan-reception portion is in registration with the exterior magnet-attachment-reception portion. An interior funnel element is supported inside the canister housing. The funnel element includes a relatively large diameter first end opening positioned adjacent to the particle-reception pan and includes a relatively small diameter second end opening in communication with an inside region of the canister housing. The relatively large diameter first end opening of the funnel element is spaced from the particle-reception pan by a separation distance. An inflow reception chamber is contained within the canister housing and is in communication with the liquid inlet channel. An outflow reception chamber is contained within the canister housing and is in communication with the liquid outlet channel and the relatively small diameter second end opening of the funnel element.

6 Claims, 3 Drawing Sheets

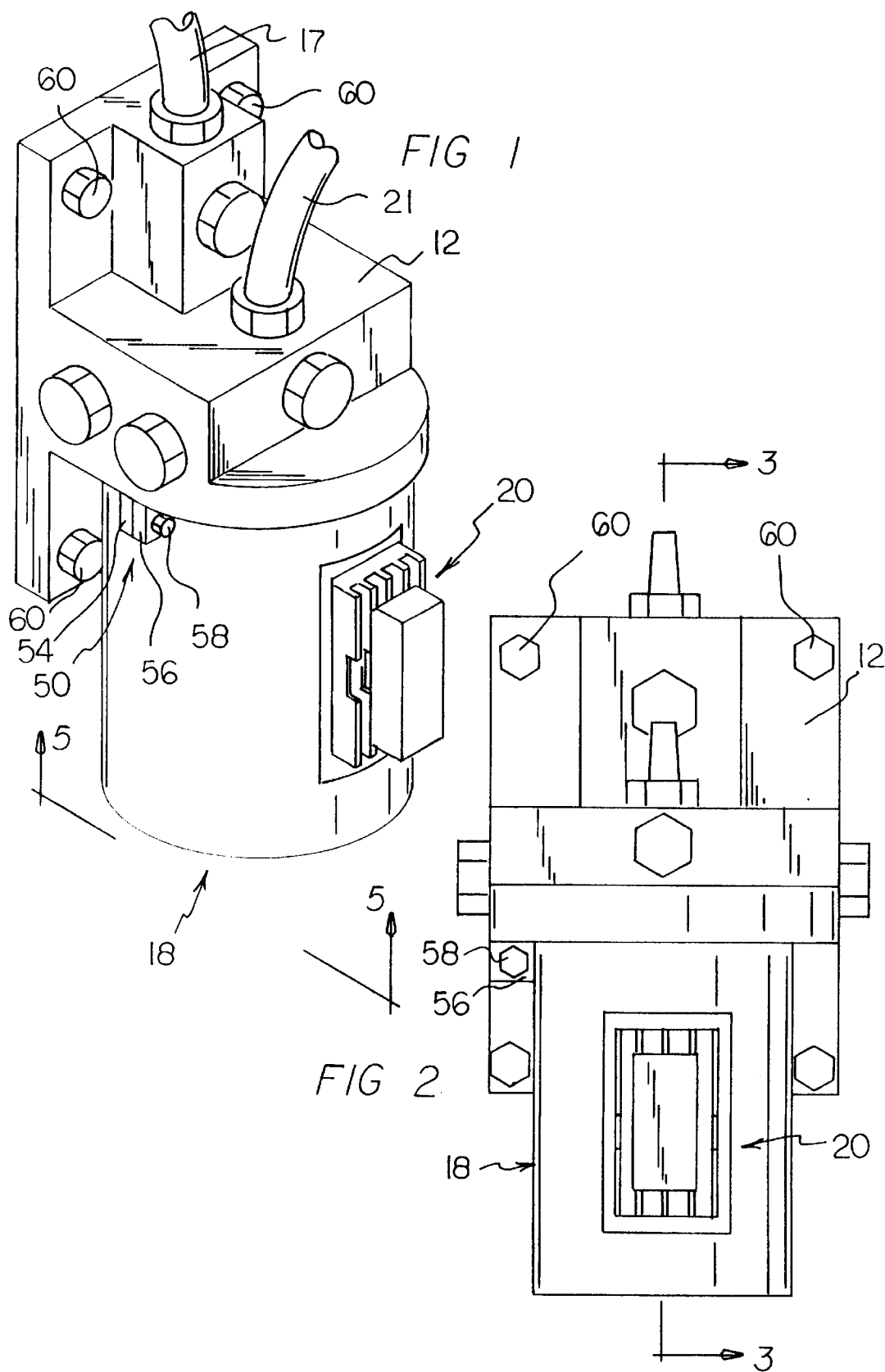

METAL PARTICLE REMOVAL AND RETENTION APPARATUS

BACKGROUND OF THE INVENTION

1. Field of the Invention

The present invention relates generally to fluid clarification systems and, more particularly, to an apparatus especially adapted for removing metal particles from the oil in oil lubrication systems of internal combustion engines.

2. Description of the Prior Art

Magnetic attachments for an oil filter cartridge for an internal combustion engine are disclosed in U.S. Pat. No. 5,510,024 by the present inventor herein. Additional magnetic attachments for an oil cartridge are disclosed in U.S. Pat. No. 5,879,549. Hereinafter the foregoing magnetic attachments are referred to as the "prior magnetic attachments"). Such prior magnetic attachments employ shunt elements and shunt magnets. Although the benefits of using the prior attachments for oil cartridges are substantial, it may be desirable to provide even greater oil clarification than provided by the prior magnetic attachments alone. In this respect, it would be desirable if means were provided for obtaining greater clarification of oil than provided by the prior magnetic attachments.

With a conventional oil filtration system for an internal combustion engine, oil is pumped from an oil pump to a filter cartridge. Particles which are trapped by the filter cartridge inevitably tend to clog the filter causing oil flow to be impeded. To reduce such filter cartridge clogging, it would be desirable if an auxiliary oil filtering device were placed between the oil pump and the filter cartridge.

Once particles are trapped by a filter, there is always a tendency for some of the trapped particles to be dislodged and reenter the oil flow. In this respect, it would be desirable if an oil filtering device were provided that reduces the tendency of trapped particles from becoming dislodged and reentering the oil flow.

For an auxiliary oil filtering device, it would be desirable if means were provided for readily attaching the auxiliary oil filtering device to the body of a motor vehicle.

In a device wherein metal particles in flowing oil are attracted to a magnetic, to assure effectiveness of the magnet in attracting the metal particles, it would be desirable if the oil flow were reduced in the flow region wherein the magnetic lines of force of the magnet are most concentrated. The slower the oil flow rate in the region of the magnetic lines of force, the greater effectiveness of the magnet for removing metal particles from the flowing oil.

Some internal combustion engines have hoses or metal lines through which lubricating oil flows. With these internal combustion engines it would be desirable if an auxiliary oil filtering device could be spliced into such an oil hose or metal line through which lubricating oil flows.

An auxiliary oil filtering device, that is used in addition to a filter cartridge, can also employ magnetic means for attracting and retaining metal particles. In this respect, it would be desirable if an auxiliary oil filtering device could also employ the prior magnetic attachments.

Thus, while the foregoing discussion indicates it to be well known to use magnetic attachments to oil filter cartridges, there is no teaching or suggestion of a metal particle removal and retention apparatus which has the following combination of desirable features: (1) provides for obtaining greater clarification of oil than provided by the prior magnetic attachments; (2) provides an auxiliary oil filtering device which is placed between an oil pump and an oil filter cartridge; (3) reduces the tendency of trapped particles from becoming dislodged and reentering the oil flow; (4) provides for readily attaching the auxiliary oil filtering device to the body of a motor vehicle; (5) reduces the oil flow in a flow region wherein the magnetic lines of force of a magnet are most concentrated; (6) provides an auxiliary oil filtering device which can be spliced into an oil hose or metal line through which lubricating oil flows; (7) provides an auxiliary oil filtering device which employs magnetic means for attracting and retaining metal particles; (8) provides an auxiliary oil filtering device which can employ piror magnetic attachments. The foregoing desired characteristics are provided by the unique metal particle removal and retention apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a metal particle removal and retention apparatus which includes a canister-retention bracket, a liquid inlet channel connected to the canister-retention bracket, a liquid outlet channel connected to the canister-retention bracket, and a canister assembly connected to the canister-retention bracket. The canister assembly is in communication with the liquid inlet channel and the liquid outlet channel. A magnet attachment assembly attached to the canister assembly. The canister assembly includes a canister housing which includes an exterior magnet-attachment-reception portion which receives the magnet attachment assembly. The canister assembly includes an interior particle-reception pan attached to an interior pan-reception portion of the canister housing. The interior pan-reception portion is in registration with the exterior magnet-attachment-reception portion.

An interior funnel element is supported inside the canister housing. The funnel element includes a relatively large diameter first end opening positioned adjacent to the particle-reception pan and includes a relatively small diameter second end opening in communication with an inside region of the canister housing. The relatively large diameter first end opening of the funnel element is spaced from the particle-reception pan by a separation distance.

An inflow reception chamber is contained within the canister housing and is in communication with the liquid inlet channel. An outflow reception chamber is contained within the canister housing and is in communication with the liquid outlet channel and the relatively small diameter second end opening of the funnel element. The canister-retention bracket includes the liquid inlet channel and the liquid outlet channel integrated into the canister-retention bracket.

The canister assembly is selectively connectable to and removable from the canister-retention bracket. Canister connectors are attached to the canister-retention bracket for selectively connecting and removing the canister assembly from the canister-retention bracket. The canister connectors include a plurality of flange-reception channels in the canister-retention bracket. The canister assembly includes a plurality of connection flanges that are received in the flange-reception channels. A clamp assembly is provided for clamping the canister assembly to the canister-retention bracket. The connection flanges are distributed around a circumferential top edge of the canister assembly. The flange-reception channels are distributed on the canister-retention bracket in a circular pattern. The flange-reception channels are registrable with the connection flanges.

Each of the flange-reception channels has a circular length which is at least twice a circular length of a respective connection flange. Each of the flange-reception channels includes an open flange-reception portion for receiving a respective connection flange and includes a closed flange reception portion for securing the respective connection flange to the canister-retention bracket.

The clamp assembly includes a first clamp tang projecting from the canister-retention bracket and a second clamp tang projecting from the canister housing. The first clamp tang and the second clamp tang are in registration when the canister-retention bracket and the canister assembly are connected together with a sealed connection. A clamping screw is provided for bonding the first clamp tang and the second clamp tang together to retain the canister-retention bracket and the canister assembly together in a sealed connection. A sealing ring is placed between the canister assembly and the canister-retention bracket for providing a seal between the canister assembly and the canister-retention bracket.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved metal particle removal and retention apparatus which has all of the advantages of the prior art and none of the disadvantages.

It is another object of the present invention to provide a new and improved metal particle removal and retention apparatus which may be easily and efficiently manufactured and marketed.

It is a further object of the present invention to provide a new and improved metal particle removal and retention apparatus which is of durable and reliable construction.

An even further object of the present invention is to provide a new and improved metal particle removal and retention apparatus which is susceptible of a low cost of manufacture with regard to both materials and labor, and which accordingly is then susceptible of low prices of sale to the consuming public, thereby making such metal particle removal and retention apparatus available to the buying public.

Still yet a further object of the present invention is to provide a new and improved metal particle removal and retention apparatus which provides for obtaining greater clarification of oil than provided by the prior magnetic attachments.

Still another object of the present invention is to provide a new and improved metal particle removal and retention apparatus that provides an auxiliary oil filtering device which is placed between an oil pump and an oil filter cartridge.

Yet another object of the present invention is to provide a new and improved metal particle removal and retention apparatus which reduces the tendency of trapped particles from becoming dislodged and reentering the oil flow.

Even another object of the present invention is to provide a new and improved metal particle removal and retention apparatus that provides for readily attaching the auxiliary oil filtering device to the body of a motor vehicle.

Still a further object of the present invention is to provide a new and improved metal particle removal and retention apparatus which reduces the oil flow in a flow region wherein the magnetic lines of force of a magnet are most concentrated.

Yet another object of the present invention is to provide a new and improved metal particle removal and retention apparatus that provides an auxiliary oil filtering device which can be spliced into an oil hose or metal line through which lubricating oil flows.

Still another object of the present invention is to provide a new and improved metal particle removal and retention apparatus which provides an auxiliary oil filtering device which employs magnetic means for attracting and retaining metal particles.

Yet another object of the present invention is to provide a new and improved metal particle removal and retention apparatus that provides an auxiliary oil filtering device which can employ prior magnetic attachments.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the metal particle removal and retention apparatus of the invention connected to oil lines connected to an internal combustion engine.

FIG. 2 is a front view of the embodiment of the metal particle removal and retention apparatus shown in FIG. 1.

DESCRIPTION OF THE PREFERRED EMBODIMENT

With reference to the drawings, a new and improved metal particle removal and retention apparatus embodying the principles and concepts of the present invention will be described.

Figure 3:
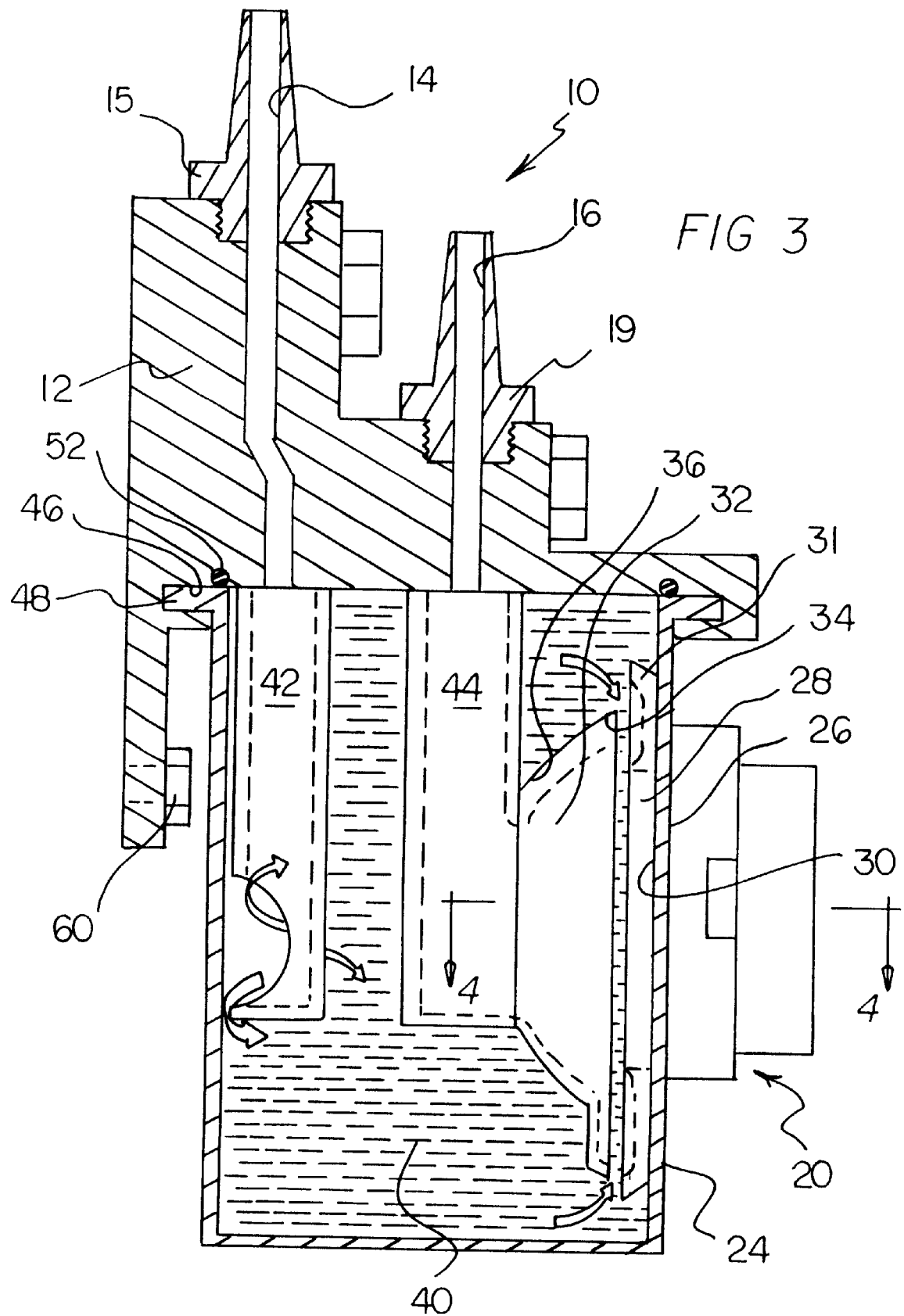
FIG. 3 is a cross-sectional view of the embodiment of the metal particle removal and retention apparatus of FIG. 2 taken along line 3—3 thereof.
Figure 4:
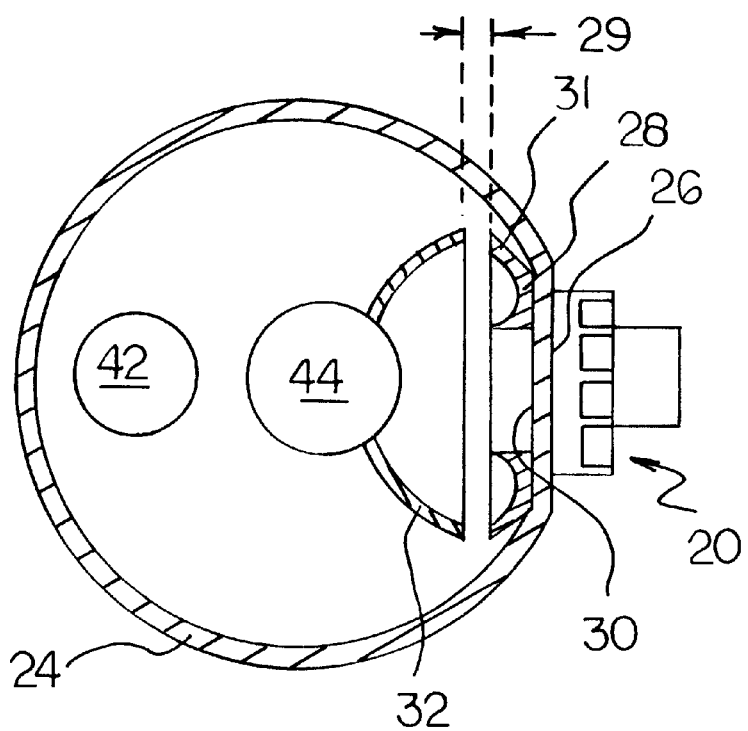
FIG. 4 is a cross-sectional view of the embodiment of the metal particle removal and retention apparatus of FIG. 3 taken along line 4—4 thereof.
Figure 5:
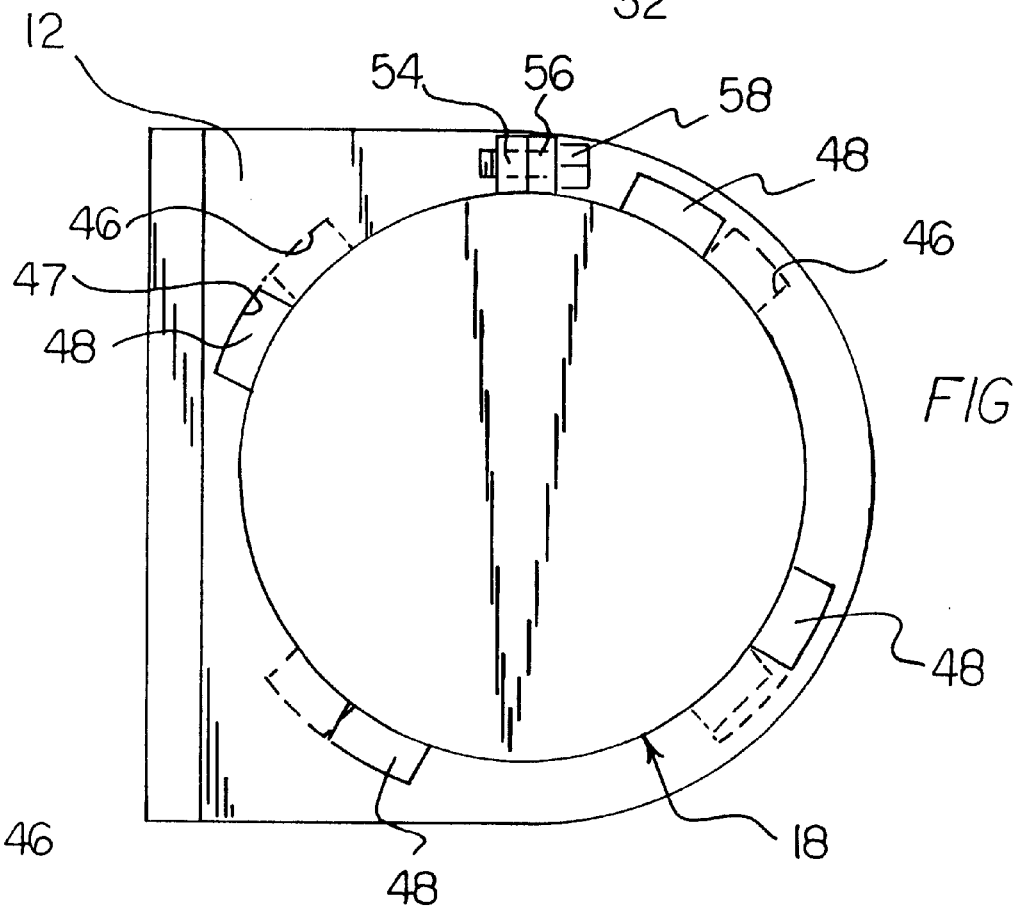
FIG. 5 is a bottom view of the embodiment of the invention shown in FIG. 1 taken along line 5—5 thereof.

Turning to FIGS. 1–5, there is shown an exemplary embodiment of the metal particle removal and retention apparatus of the invention generally designated by reference numeral 10. In its preferred form, metal particle removal and retention apparatus 10 includes a canister-retention bracket 12, a liquid inlet channel 14 connected to the canister-retention bracket 12, a liquid outlet channel 16 connected to the canister-retention bracket 12, and a canister assembly 18 connected to the canister-retention bracket 12. The canister assembly 18 is in communication with the liquid inlet channel 14 and the liquid outlet channel 16. A magnet attachment assembly 20 attached to the canister assembly 18. The canister assembly 18 includes a canister housing 24 which includes an exterior magnet-attachment-reception portion 26 which receives the magnet attachment assembly 20. The canister assembly 18 includes an interior particle-reception pan 28 attached to an interior pan-reception portion 30 of the canister housing 24. The interior pan-reception portion 30 is in registration with the exterior magnet-attachment-reception portion 26.

An interior funnel element 32 is supported inside the canister housing 24. The funnel element 32 includes a relatively large diameter first end opening 34 positioned adjacent to the particle-reception pan 28 and includes a relatively small diameter second end opening 36 in communication with an inside region 40 of the canister housing 24. The relatively large diameter first end opening 34 of the funnel element 32 is spaced from the particle-reception pan 28 by a separation distance 29. The separation distance 29 is relatively small. As a result, virtually all the oil that enters the funnel element 32 must pass close to the particle-reception pan 28 and close to the magnet attachment assembly 20. This is the case, the oil is exposed to relatively large magnetic fields, and particles that are attracted to those magnetic fields are retained by the particle-reception pan 28. The particle-reception pan 28 has pan walls 31 which serve to shield the contents of the particle-reception pan 28 from flow disturbances caused by flowing oil. Therefore, once particles are retained in the particle-reception pan 28, the pan walls 31 help protect the retained particles from being agitated and from reentering the flowing oil.

An inflow reception chamber 42 is contained within the canister housing 24 and is in communication with the liquid inlet channel 14. An outflow reception chamber 44 is contained within the canister housing 24 and is in communication with the liquid outlet channel 16 and the relatively small diameter second end opening 36 of the funnel element 32. The canister-retention bracket 12 includes the liquid inlet channel 14 and the liquid outlet channel 16 integrated into the canister-retention bracket 12.

The canister assembly 18 is selectively connectable to and removable from the canister-retention bracket 12. Canister connectors are attached to the canister-retention bracket 12 for selectively connecting and removing the canister assembly 18 from the canister-retention bracket 12. The canister connectors include a plurality of flange-reception channels in the canister-retention bracket 12. The canister assembly 18 includes a plurality of connection flanges 48 that are received in the flange-reception channels. A clamp assembly 50 is provided for clamping the canister assembly 18 to the canister-retention bracket 12. The connection flanges 48 are distributed around a circumferential top edge of the canister assembly 18. The flange-reception channels are distributed on the canister-retention bracket 12 in a circular pattern. The flange-reception channels are registrable with the connection flanges 48.

Each of the flange-reception channels has a circular length which is at least twice a circular length of a respective connection flange 48. Each of the flange-reception channels includes an open flange-reception portion 47 for receiving a respective connection flange 48 and includes a closed flange reception portion 46 for securing the respective connection flange 48 to the canister-retention bracket 12.

The clamp assembly 50 includes a first clamp tang 54 projecting from the canister-retention bracket 12 and a second clamp tang 56 projecting from the canister housing 24. The first clamp tang 54 and the second clamp tang 56 are in registration when the canister-retention bracket 12 and the canister assembly 18 are connected together with a sealed connection. A clamping screw 58 is provided for bonding the first clamp tang 54 and the second clamp tang 56 together to retain the canister-retention bracket 12 and the canister assembly 18 together in a sealed connection. A sealing ring 52 is placed between the canister assembly 18 and the canister-retention bracket 12 for providing a seal between the canister assembly 18 and the canister-retention bracket 12.

To use the metal particle removal and retention apparatus 10 of the invention, attachment bolts 60 are used to attach the canister-retention bracket 12 to a vehicle structure (not shown). An inlet fitting 15 is connected to an oil inlet hose 17, and these form part of the liquid inlet channel 14 that brings oil into the canister assembly 18. An outlet fitting 19 is connected to an oil outlet hose 21, and these form part of the liquid outlet channel 16 that takes oil away from the canister assembly 18.

In operation, oil which contains metal particles enters the liquid inlet channel 14, flows through the inflow reception chamber 42, flows into the inside region 40 of the canister assembly 18, flows into the space between the funnel element 32 and the particle-reception pan 28, flows through the funnel element 32 from the relatively large diameter first end opening 34 to the relatively small diameter second end opening 36, flows into the outflow reception chamber 44, and flows out from the liquid outlet channel 16 into the outlet hose 21.

In its flow path through the canister assembly 18, the flow of oil is slowed as it enters the space between the particle-reception pan 28 and the funnel element 32 and is slowed as it passes through the funnel element 32 from the relatively large diameter first end opening 34 to the relatively small diameter second end opening 36. As the oil flow is slowed, the oil is exposed to the magnetic field from the magnet attachment assembly 20 for a relatively long time, whereby metal particles are attracted by the magnet attachment assembly 20 and retained in the particle-reception pan 28. Once the oil enters the outflow reception chamber 44, the speed of oil flow increases.

To affix the canister assembly 18 to the canister-retention bracket 12, the connection flanges 48 are placed in registration and inserted into the open flange-reception portions 47 of the flange-reception channels. Then, the canister assembly 18 is rotated, whereby the connection flanges 48 enter into the closed flange reception portions 46. In this way, the connection flanges 48 are secured to the canister-retention bracket 12. To assure that the canister assembly 18 does not rotate during use, the clamp assembly 50 is used to clamp the canister assembly 18 to the canister-retention bracket 12. More specifically, once the canister assembly 18 is secured to the canister-retention bracket 12 by employing the closed flange reception portions 46 and the connection flanges 48, the first clamp tang 54 and the second clamp tang 56 are placed in registration, and the clamping screw 58 is used to secure the first clamp tang 54 and the second clamp tang 56 together.

To remove the canister assembly 18 from the canister-retention bracket 12, the clamping screw 58 is unscrewed, and the canister assembly 18 is rotated in the opposite direction from assembly to move the connection flanges 48 into the open flange-reception portions 47, and the canister assembly 18 is lowered from the canister-retention bracket 12.

The magnet attachment assembly 20 shown in the drawings herein can be substituted with the prior magnet attachments. In this respect, U.S. Pat. No. 5,510,024 and U.S. Pat. No. 5,879,549 are incorporated herein by reference.

The components of the metal particle removal and retention apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved metal particle removal and retention apparatus that is low in cost, relatively simple in design and operation, and which may advantageously be used to provide for obtaining greater clarification of oil than provided by the prior magnetic attachments. With the invention, a metal particle removal and retention apparatus provides an auxiliary oil filtering device which is placed between an oil pump and an oil filter cartridge. With the invention, a metal particle removal and retention apparatus is provided which reduces the tendency of trapped particles from becoming dislodged and reentering the oil flow. With the invention, a metal particle removal and retention apparatus provides for readily attaching the auxiliary oil filtering device to the body of a motor vehicle. With the invention, a metal particle removal and retention apparatus is provided which reduces the oil flow in a flow region wherein the magnetic lines of force of a magnet are most concentrated. With the invention, a metal particle removal and retention apparatus provides an auxiliary oil filtering device which can be spliced into an oil hose or metal line through which lubricating oil flows. With the invention, a metal particle removal and retention apparatus provides an auxiliary oil filtering device which employs magnetic means for attracting and retaining metal particles. With the invention, a metal particle removal and retention apparatus provides an auxiliary oil filtering device which can employ prior magnetic attachments.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A metal particle removal and retention apparatus for use with a magnet attachment assembly, comprising:

a canister-retention bracket, a liquid inlet channel connected to said canister-retention bracket, a liquid outlet channel connected to said canister-retention bracket, a canister assembly connected to said canister-retention bracket, wherein said canister assembly is in communication with said liquid inlet channel and said liquid outlet channel, and wherein said canister assembly includes a canister housing which includes an exterior magnet-attachment-reception portion which is adapted to receive said magnet attachment assembly, wherein said canister assembly includes an interior particle-reception pan attached to an interior pan-reception portion of said canister housing, wherein said interior pan-reception portion is in registration with said exterior magnet-attachment-reception portion;

an interior funnel element supported inside said canister housing, wherein said funnel element includes a relatively large diameter first end opening positioned adjacent to said particle-reception pan and includes a relatively small diameter second end opening in communication with an inside region of said canister housing, wherein said relatively large diameter first end opening of said funnel element is spaced from said particle-reception pan by a relatively narrow separation distance, an inflow reception chamber, contained within said canister housing, in communication with said liquid inlet channel, and an outflow reception chamber, contained with said canister housing, in communication with said liquid outlet channel and said relatively small diameter second end opening of said funnel element.

2. The apparatus of claim 1 wherein said canister-retention bracket includes said liquid inlet channel and said liquid outlet channel integrated into said canister-retention bracket.

3. The apparatus of claim 1 wherein said canister assembly is selectively connectable to and removable from said canister-retention bracket.

4. The apparatus of claim 1, further including:

canister connector means, attached to said canister-retention bracket, for selectively connecting and removing said canister assembly from said canister-retention bracket.

5. The apparatus of claim 4 wherein:

said canister connector means include a plurality of flange-reception channels in said canister-retention bracket, said canister assembly includes a plurality of connection flanges that are received in said flange-reception channels, and a clamp assembly for clamping said canister assembly to said canister-retention bracket.

6. The apparatus as defined in claim 1 further including a magnet attachment assembly combined with said apparatus, said magnet attachment assembly being attached to said exterior magnet-attachment-reception portion of said housing.

* * * * *